(12) United States Patent
Dai

(10) Patent No.: US 9,478,132 B1
(45) Date of Patent: Oct. 25, 2016

(54) VEHICLE HAZARD DETECTION AND WARNING SYSTEM

(71) Applicant: Thunder Power Hong Kong Ltd., Central (HK)

(72) Inventor: Yu-Ting Dai, New Taipei (TW)

(73) Assignee: THUNDER POWER HONG KONG LTD., Central (HK)

( * ) Notice: Subject to any disclaimer, the term of this patent is extended or adjusted under 35 U.S.C. 154(b) by 0 days.

(21) Appl. No.: 14/983,472

(22) Filed: Dec. 29, 2015

(51) Int. Cl.
*B60Q 1/00* (2006.01)
*G08G 1/0967* (2006.01)

(52) U.S. Cl.
CPC .............................. *G08G 1/096775* (2013.01)

(58) Field of Classification Search
CPC ................. G08G 1/096775; G08G 1/096708
USPC ...................... 340/905, 425.5, 576, 438, 439
See application file for complete search history.

(56) References Cited

U.S. PATENT DOCUMENTS

| | | | | |
|---|---|---|---|---|
| 5,146,219 A | * | 9/1992 | Zechnall | B60K 31/0058 340/905 |
| 5,270,708 A | * | 12/1993 | Kamishima | G01C 21/3697 340/905 |
| 5,315,295 A | * | 5/1994 | Fujii | B60K 31/0058 180/167 |
| 6,459,365 B2 | * | 10/2002 | Tamura | G01C 21/3697 340/425.5 |
| 2007/0150140 A1 | * | 6/2007 | Seymour | G07C 5/008 701/33.4 |
| 2009/0299630 A1 | * | 12/2009 | Denaro | B60W 30/18009 701/300 |
| 2013/0054103 A1 | * | 2/2013 | Herink | B60T 7/22 701/65 |
| 2013/0261916 A1 | * | 10/2013 | Sekiguchi | B60T 7/22 701/70 |

* cited by examiner

*Primary Examiner* — Brent Swarthout
(74) *Attorney, Agent, or Firm* — Kilpatrick Townsend & Stockton LLP

(57) ABSTRACT

Described herein is a vehicle system configured to identify and mitigate a risk associated with one or more hazards that may impact a vehicle. The vehicle system may include a service provider computer configured to maintain information related to one or more hazards. In some embodiments, a hazard may be identified based at least in part on its being located within the vicinity of a vehicle. In some embodiments, the service provider computer may generate a mitigation strategy to reduce or eliminate the risk posed by the identified hazard. The mitigation strategy may include one or more actions to be taken by a processor device within the vehicle. Upon being provided with a mitigation strategy, the processor device may execute one or more of the actions in the mitigation strategy without human interaction.

19 Claims, 6 Drawing Sheets

VEHICLE HAZARD DETECTION AND WARNING SYSTEM

BACKGROUND

Road hazards can often make driving on roads unsafe. Although some road hazards may be avoided, some may not. It is often difficult for a driver to assess a proper means of traversing an unavoidable road hazard. For example, the driver may not have sufficient experience with driving in snow to determine a safe traveling speed. Furthermore, some road hazards, such as black ice, may be undetectable by even an experienced driver. Notification of a hazard in time to take suitable evasive action and avoid a crash is an essential part of safe driving.

SUMMARY

The present disclosure solves these and other problems with the current technology. In particular, the disclosure provides a vehicle system capable of determining that a vehicle is approaching a hazard and mitigating a risk associated with the hazard. In some embodiments, the system is able to track multiple vehicles using location data associated with each vehicle. The system may also include a database having location data associated with one or more hazards. As a vehicle is determined to be approaching a hazard, the service provider computer may determine an appropriate mitigation strategy for the hazard. In some embodiments, the system may provide a notification to an operator of the vehicle. In some embodiments, the system may initiate one or more vehicle functions in accordance with the determined mitigation strategy.

BRIEF DESCRIPTION OF THE DRAWINGS

Various embodiments in accordance with the present disclosure will be described with reference to the drawings, in which.

DETAILED DESCRIPTION

Figure 1:
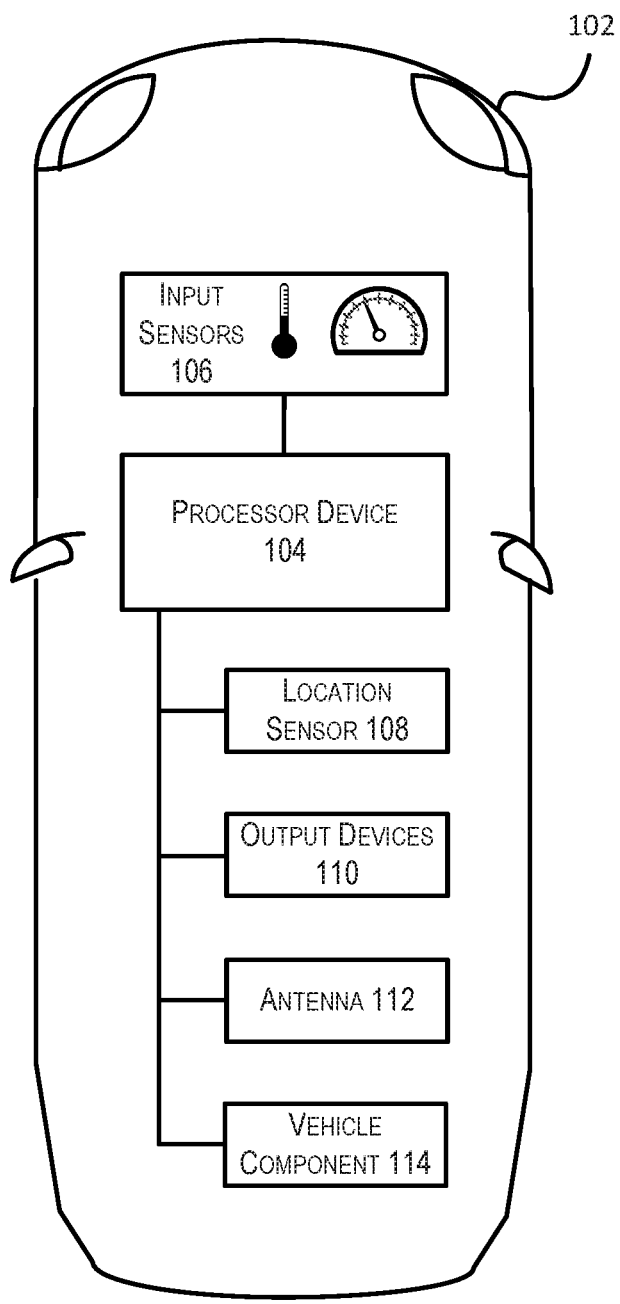
FIG. 1 depicts one or more components that may be included in a vehicle system in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing specific embodiments of the invention, some terms may be described in detail.

A "vehicle system" may be any system comprising various components of a vehicle as well as any devices external to the vehicle that are configured to provide data to the vehicle. For example, a vehicle system may include a number of input sensors, a processor device capable of processing data from the input sensors, a service provider computer configured to perform one or more calculations with respect to the vehicle, a transmission means (e.g., a wireless platform) for enabling access between the processor device and the service provider computer, and any other suitable component.

A "target vehicle" may be any vehicle for which the vehicle system is collecting data. A vehicle system may collect data for multiple target vehicles simultaneously. The vehicle system may identify a target vehicle and associate each of the vehicle's movements (or changes in location data) with the identified target vehicle. In some embodiments, a service provider computer may maintain one or more variable values in relation to the vehicles.

A "mitigation strategy" may be any set of instructions determined to result in a lowered probability of a risk. A mitigation strategy may include one or more instructions to provide notifications and/or one or more instructions to initiate an action. For example, a mitigation strategy may include an instruction to provide a warning to an operator of a vehicle of a hazard in order to decrease the risk that the operator of the vehicle will be effected by the hazard. In another example, the mitigation strategy may include an instruction that causes the vehicle's braking system to activate, slowing the vehicle. In some embodiments, the mitigation strategy may include a number of instructions, each of which is separately determined to result in a reduction to the identified risk. For example, the mitigation strategy may include instructions that cause an increase to the sensitivity of the vehicle's braking system as well as instructions that cause a decrease to the sensitivity of the vehicle's throttle system. In some embodiments, the instructions included in a mitigation strategy may be ordered or associated with timing data. For example, a mitigation strategy may include instructions to provide a notification, wait some period of time, determine whether the notification was successful in mitigating the risk, and perform a second action if the notification was not successful in mitigating the risk.

A "hazard" may be any impediment to driving that is associated with a risk or exposure to danger. A risk may be any exposure of a driver and/or vehicle to potential injury, death, or damage. For example, a hazard may be a patch of ice or water that exposes the vehicle to loss of traction, and subsequently to a potential accident. In another example, a hazard may be a curve in a road that exposes a vehicle to a potential failure to turn, and subsequently to a potential accident. In some non-limiting examples, a hazard may include a slippery road surface, a traffic jam or other sudden slowing of traffic, a curve in the road, debris in the road, or any other suitable impediment to driving.

A "vehicle function component" may be any device capable of executing at least one function of a vehicle. For example, a master cylinder is a vehicle function component that executes a vehicle's braking function by applying hydraulic pressure to a brake disk. In some embodiments, the master cylinder may be signaled to execute the vehicle's brakes by a processor device. In some embodiments, the hydraulic pressure of the braking system may be increased at the master cylinder in order to increase the amount of braking force applied to the brake disk in response to an amount of movement of the brake pedal.

In some embodiments, a vehicle system may include a service provider computer (the provider of the vehicle system service) and one or more target vehicles. The service provider computer may receive location information from a target vehicle included in the vehicle system. In some embodiments, the service provider computer may identify one or more hazards that are potentially relevant to the target vehicle based on its provided location. For example, the service provider computer may query a database to identify one or more hazards within the vicinity of the target vehicle. For the purposes of this disclosure, "within the vicinity of the target vehicle" may mean that something is located within a predetermined distance from the target vehicle. Upon detecting that one or more hazards may potentially impact the target vehicle, the service provider computer may generate a mitigation strategy determined to reduce a risk associated with the identified hazards for the target vehicle. In some embodiments, the mitigation strategy may include instructions that may be executed by a processor device installed in the target vehicle.

In some embodiments, information associated with one or more hazards may be added to a hazard database maintained by the service provider computer as the hazard is detected. In some embodiments, the service provider computer may update the hazard database based on information provided by one or more third party entities (e.g., entities unaffiliated with the service provider). For example, the service provider may receive an indication of a hazard provided by a department of transportation. In some embodiments, the service provider may update the hazard database based on information provided by one or more vehicles. For example, a vehicle may lose traction at a particular location. Upon detecting the loss of traction, the vehicle may provide an indication of the loss of traction and the vehicle's location to the service provider computer. The service provider computer may subsequently update the hazard database to include a hazard entry related to the loss of traction with relation to the received location data.

FIG. 1 depicts one or more components that may be included in a vehicle system in accordance with at least some embodiments. For example, a vehicle 102 configured to interact with the vehicle system may include a processor device 104, a number of input sensors 106 capable of collecting various types of input, a location sensor 108 (e.g., a global positioning system device), one or more output devices 110, an antenna device capable of enabling communication between the processor device 104 and one or more external components, and one or more vehicle function components 114 configured to interact with a vehicle function.

In accordance with at least some embodiments, the processor device 104 included in the vehicle system may comprise any type of computing device capable of performing computations and executing machine executable instructions written in any suitable programming language. In some embodiments, the processor device may include an operating system and a basic input/output system (BIOS) configured to enable interaction between the operating system and one or more attached devices.

In accordance with at least some embodiments, the input sensors 106 included in the vehicle system may comprise any device capable of collecting data related to one or more vehicle conditions and reporting the data (or a processed form of the data) to the processor device. Some non-limiting examples of an input sensor may include an accelerometer, a camera, a microphone, a thermometer, a speedometer, a humidity sensor, a tire pressure gauge, a pressure sensor, or any other suitable sensing device.

In accordance with at least some embodiments, the location sensor 108 included in the vehicle system may comprise any device capable of ascertaining a location of the vehicle. For example, the location sensor may be a global positioning system (GPS) device. In another example, the location sensor may be a signal transmitter whose location may be determined by using a multilateration process on multiple radio signals output by various radio towers. In some embodiments, the location sensor 108 may continuously provide location data to the processor device 104. In some embodiments, the location sensor 108 may provide location updates to the processor device 104 periodically.

In accordance with at least some embodiments, the output devices 110 included in the vehicle system may comprise any device capable of providing a notification to an operator of a vehicle. In some embodiments, the output devices 110 may include a speaker and the notification may be provided as an audio notification. In some embodiments, the output devices may include a display device and the notification may be provided as a visual notification. For example, the notification may be provided as text and/or an image on a display screen of the display device.

In accordance with at least some embodiments, the antenna 112 included in the vehicle system may comprise an device capable of enabling wireless communication between the processor device and another electronic device. In some embodiments, the antenna may enable communication between the processor device and another electronic device via a wireless local area network (WLAN) such as Wi-Fi. In some embodiments, the antenna may enable communication between the processor device and another electronic device via a wireless communication network (e.g., 3G, 4G, etc.).

In accordance with at least some embodiments, the vehicle function component 114 included in the vehicle system may comprise any device capable of executing at least one function of a vehicle. In some embodiments, the vehicle function component may activate or deactivate one or more functionalities of the vehicle. In some embodiments, the vehicle function component may be configured to cause a sensitivity or other value associated with a vehicle functionality to be adjusted. For example, the vehicle function component may be used to increase the sensitivity of the brake pedal of the braking system (the amount of braking force applied in response to an amount of movement of the brake pedal).

Figure 2:
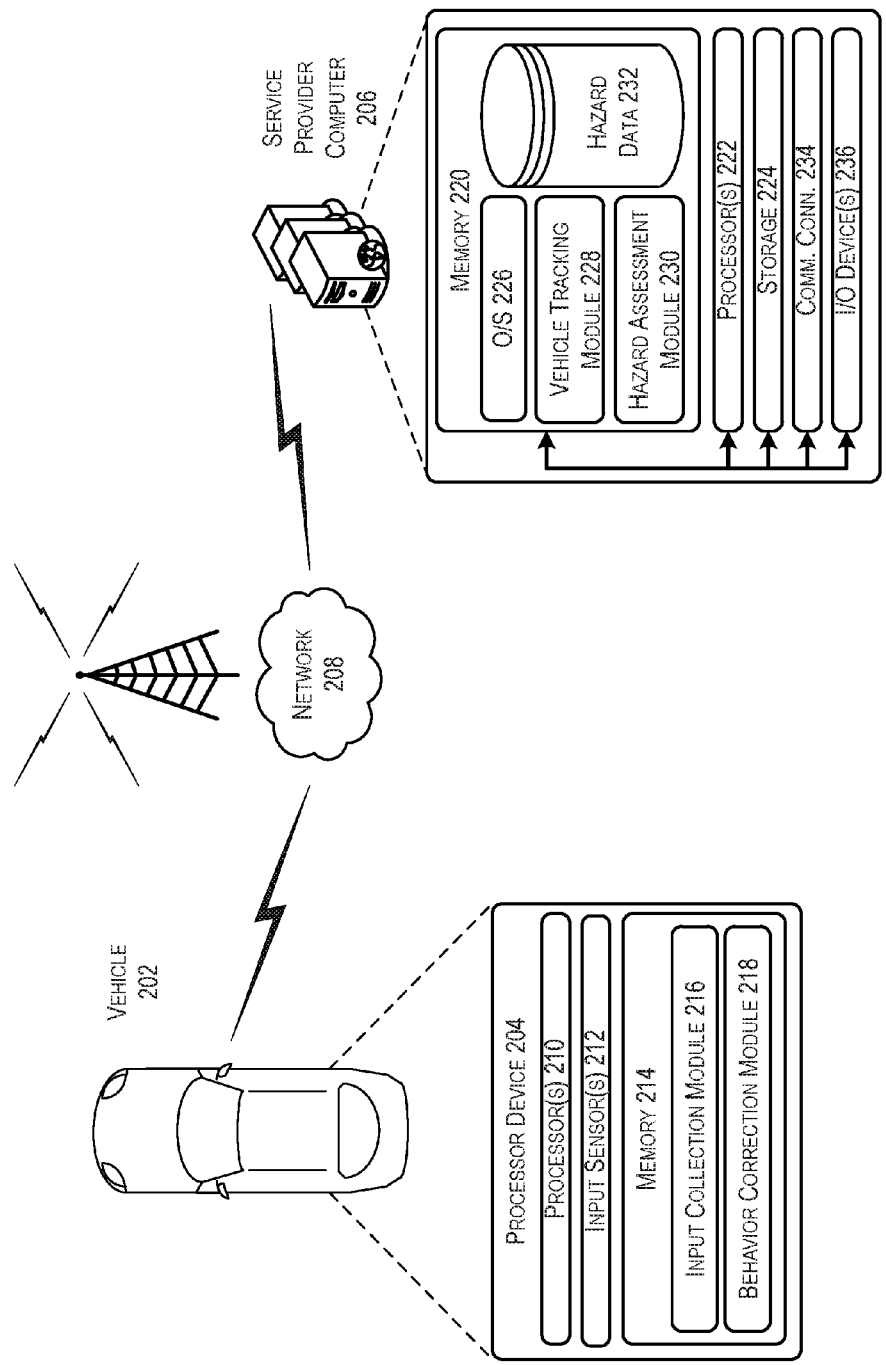
FIG. 2 depicts system or architecture in which techniques for identifying an upcoming hazard and mitigating risk associated with the upcoming hazard may be implemented in accordance with the disclosure.

FIG. 2 depicts system or architecture in which techniques for identifying an upcoming hazard and mitigating risk associated with the upcoming hazard may be implemented in accordance with the disclosure. In some examples, a vehicle 202 may include a processor device 204. In some embodiments, the processor device 204 may be configured to communicate with a service provider computer 206 via a network 208, or via other communication connections.

The processor device 204 may be any type of computing device capable of performing the described functions. The processor device 204 may include one or more processors 210 capable of processing input from one or more input sensors 212. As is known in the art, there are a variety of input sensors 212 capable of detecting input related to a user or vehicle conditions, such as accelerometers, cameras, microphones, thermometers, speedometers, etc. The input obtained by the input sensors 212 may be from a variety of data input types, including, but not limited to, audio data, visual data, or biometric data. Programmatic code for an application or module utilized in the implementation of at least some embodiments may be stored and executed from the memory 214 of processor device 204. The processor device 204 may include a module for processing input information collected from one or more input sensors 212 (input collection module 216) and/or a module for implementing a mitigation strategy (risk mitigation module 218).

Turning to the contents of the memory 214 in more detail, the memory 214 may include the one or more application programs or services for implementing the features disclosed herein, including an input collection module 216 and/or a behavior correction module 218.

In some embodiments, an input collection module 216 may be configured to receive input information from one or more input sensors and identify information to be provided to the service provider computer 206. In some embodiments, one or more input types may be continuously provided to the service provider computer 206. In some embodiments, some input types may only be provided to the service provider computer 206 under specified conditions. For example, if the input detected by one or more input sensors 212 is associated with a value above (or below) a threshold value, then the value may be provided to the service provider computer 206. In some embodiments, values associated with input from one input sensor may only be provided to the service provider computer 206 upon determining that a value associated with input from a second input sensor is above (or below) a threshold value. In some embodiments, values obtained from an input sensor may be provided to a service provider computer upon determining that the values are abnormal. In some embodiments, values associated with input an input sensor may be provided to the service provider upon receiving a request for the value from the service provider.

In some embodiments, a behavior correction module 218 may be configured to receive a mitigation strategy from a service provider computer 206 and to initiate one or more actions based on instructions included in the mitigation strategy. In some embodiments, the behavior correction module 218 may be configured to provide a recommendation for avoiding the hazard or mitigating a risk associated with driving near or through the hazard. For, example, the behavior correction module 218 may provide an indication to an operator of a vehicle of upcoming (in the current route of the vehicle) potential hazards, and recommend alternative routes that may be used to avoid the potential hazards. In some embodiments, the behavior correction module 218 may be configured to take over control of one or more vehicle functions in order to automate mitigation of a risk associated with the hazard. For example, the mitigation strategy may include instructions to apply the vehicle's brakes. In this example, the behavior correction module 218 may receive the mitigation strategy from the service provider computer and may subsequently execute the instructions by sending a signal to the braking system to cause the braking system to activate.

In some examples, the network(s) 208 may include any one or a combination of many different types of networks, such as cable networks, the Internet, wireless networks, cellular networks, and other private and/or public networks. It is also noted that the described techniques may apply in other client/server arrangements, as well as in non-client/server arrangements (e.g., locally stored applications, peer-to-peer systems, etc.). In an exemplary embodiment, the processor device 304 may communicate with a network hub using one or more wireless communication networks (e.g., 3G, 4G, etc.). The network hub may, in turn, utilize a physical connection (e.g., copper cable, T1, Ethernet, etc.) to communicate with the service provider computer at a network address.

The service provider computer 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that, in some embodiments, the service provider computer 206 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider computer 206 may include at least one memory 220 and one or more processing units (or processor(s)) 222. The processor(s) 222 may be implemented as appropriate in hardware, computer-executable instructions, firmware or combinations thereof. Computer-executable instruction or firmware implementations of the processor(s) 222 may include computer-executable or machine executable instructions written in any suitable programming language to perform the various functions described.

The memory 220 may store program instructions that are loadable and executable on the processor(s) 210 and/or processor(s) 222, as well as data generated during the execution of these programs. Depending on the configuration and type of service provider computer 206, the memory 220 may be volatile (such as random access memory (RAM)) and/or non-volatile (such as read-only memory (ROM), flash memory, etc.). The service provider computer 206 may also include additional storage 224, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM. Turning to the contents of the memory 220 in more detail, the memory 220 may include an operating system 226 and one or more application programs or services for implementing the features disclosed herein including at least a module for tracking vehicle location data (vehicle tracking module 228) and/or a module for identifying a potential hazard and generating a mitigation strategy (hazard assessment module 230). The memory 220 may also include hazard data 232, which provides data related to hazard locations. In some embodiments, the hazard data 232 may be stored in a database.

The memory 220 and the additional storage 224, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the processor device 204 or the service provider computer 206. The service provider computer 206 may also contain communications connection(s) 234 that allow the service provider computer 206 to communicate with a stored database, another computing device or server, user terminals, and/or other devices on the network(s) 208. The service provider computer 206 may also include input/output (I/O) device(s) and/or ports 236, such as for enabling connection with a keyboard, a mouse, a pen, a voice input device, a touch input device, a display, speakers, a printer, etc.

Turning to the contents of the memory 220 in more detail, the memory 220 may include an operating system 226, a database containing hazard data 232, and the one or more application programs or services for implementing the features disclosed herein, including a vehicle tracking module 228 and/or a hazard assessment module 230.

In some embodiments, the vehicle tracking module 228 may be configured to receive an indication of a target vehicle's location information from a processor device 204. The vehicle tracking module may be configured to identify hazards that may potentially impact a target vehicle. In some embodiments, the vehicle tracking module may periodically update the vehicle's location based on the received location information and query the hazard database 232 to identify any hazards within the vicinity of the target vehicle. In some embodiments, the vehicle tracking module 228 may track multiple vehicles simultaneously. Upon detecting a hazard within the vicinity of the target vehicle, the service provider may execute a hazard assessment module 230 to determine an appropriate mitigation strategy for the detected hazard.

In some embodiments, the hazard assessment module 230 may be configured to receive an indication of a potential hazard from the vehicle tracking module 228 and generate a mitigation strategy for a target vehicle. The service provider may determine a risk to the target vehicle associated with each hazard identified by the vehicle tracking module 228. Once the service provider has identified a risk, it may identify one or more actions that may be used to mitigate that risk. For example, the service provider may maintain a database of actions that may be used to mitigate particular risks. In this example, once the service provider has identified a risk associated with a particular hazard, the service provider may then query the database to identify an appropriate action to mitigate the risk associated with that hazard. In some embodiments the hazard assessment module 230 may compile a mitigation strategy as a set of actions configured to mitigate various risks. Once the hazard assessment module 230 has generated a mitigation strategy, the mitigation strategy may be communicated to the processor device 204.

Although depicted in FIG. 2 as being included in the processor device 204 or the service provider computer 206, it should be noted that any of the modules described may be implemented on either the processor device 204 or the service provider computer 206, regardless of where they are depicted. For example, in some embodiments, the vehicle tracking module 228 and/or the hazard assessment module 230 may be implemented on, and executed from, the processor device 204. In embodiments in which one or more of the modules are included at the service provider, the processor device 204 may transmit information obtained from the input sensors to the service provider computer 206 to be processed by the service provider. For example, the processor device 204 may provide streaming location data to the service provider computer 206.

Figure 3:
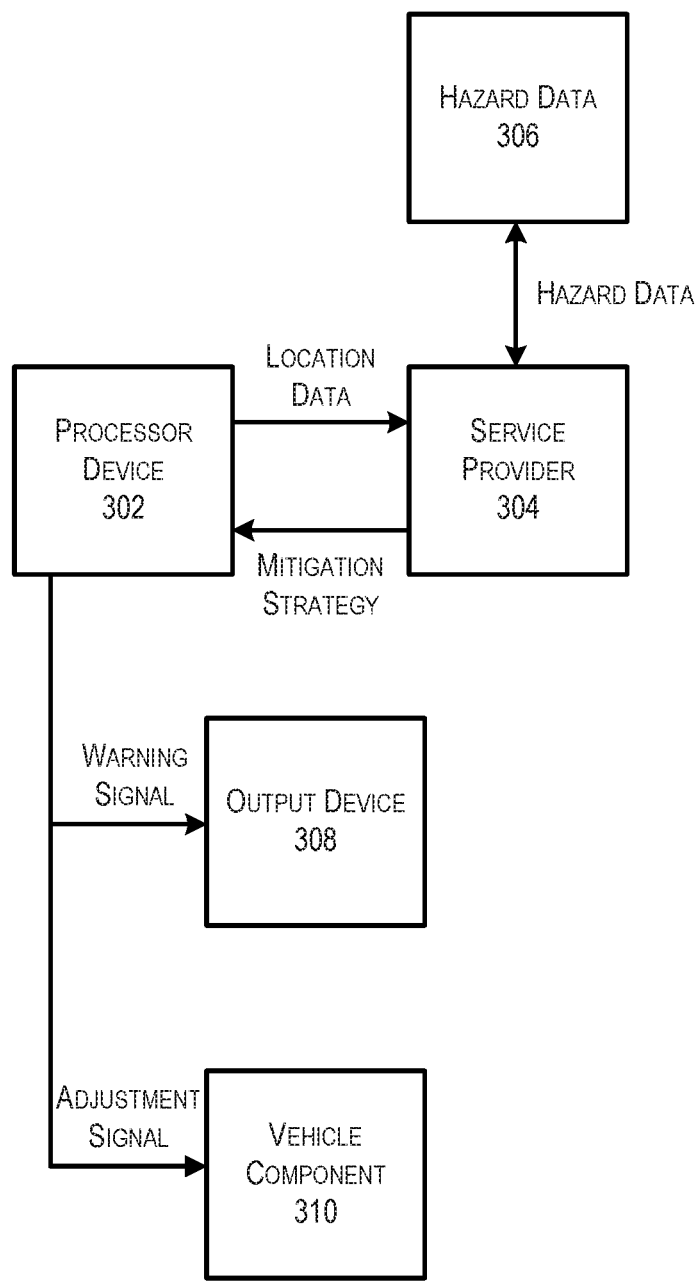
FIG. 3 depicts an illustrative flow diagram illustrating a process for providing a mitigation strategy in accordance with at least some embodiments.

FIG. 3 depicts an illustrative flow diagram illustrating a process for providing a mitigation strategy in accordance with at least some embodiments. In FIG. 3, an vehicle system may include one or more processor devices 302. The processor device 302 may be an example processor device 204 of FIG. 2. Location data captured by the one or more processor devices 302 may be transmitted to, and processed at, a service provider 304. The service provider 304 may be an example service provider 206 of FIG. 2.

Upon receiving a target vehicle's location data from the processor device 302, the service provider computer 304 may query a hazard database 306 for hazard location information. In some embodiments, the service provider may calculate a velocity (speed and direction) of the target vehicle based on its past and current location information. Upon identifying a vehicle's velocity, the service provider computer 304 may identify one or more hazards within the path of the target vehicle. The service provider may then generate a mitigation strategy based on the identified hazards. The mitigation strategy may be configured to mitigate a risk associated with the identified hazards.

The mitigation strategy may be provided to the processor device 302, which may subsequently initiate one or more actions based on the mitigation strategy. In some embodiments, the mitigation strategy may include an instruction to first notify the operator of the target vehicle of the hazard by providing a warning via an output device 308. In some embodiments, the mitigation strategy may include an instruction to adjust one or more vehicle functions executed by a vehicle function component 310.

In some embodiments, the processor device 302 may provide, according to the mitigation strategy, a warning signal to an output device 308. The output device may be configured to display, or otherwise present, a message included in the warning signal. For example, the output device may comprise a speaker and the warning signal may include an audio notification. In another example, the output device may comprise a display device and the warning signal may include a visual notification.

In some embodiments, the processor device 302 may provide, according to the mitigation strategy, an adjustment signal to a vehicle function component 310. In some embodiments, the adjustment signal may be configured to cause the vehicle function component 310 to activate or deactivate one or more functionalities of the vehicle. In some embodiments, the adjustment signal may be configured to cause the vehicle function component 310 to adjust a sensitivity or other value associated with a vehicle functionality. For example, the signal may cause the braking system to increase the sensitivity of the brake pedal (the amount of braking force applied in response to an amount of movement of the brake pedal). In this example, the master cylinder of the braking system may increase or decrease the hydraulic pressure within the braking system in order to effect the sensitivity of the brake pedal.

By way of illustrative example, consider a scenario in which a service provider determines that a target vehicle is approaching a curve in the road. The service provider may determine that the vehicle is moving at a higher speed than is safe for the curve. The service provider may also estimate a time that the vehicle is likely to reach the curve based on the speed of the target vehicle. In this example, the service provider may determine that the target vehicle will need to be slowed prior to reaching the curve (the potential hazard). The service provider computer may generate, and provide to the processor device 302, a mitigation strategy that results in the following actions. The processor device 302 may first warn the operator of the target vehicle of the upcoming curve. Sometime later, upon detecting that the speed of the target vehicle has not been reduced, the processor device 302 may provide a warning to the operator of the target vehicle to reduce the speed of the vehicle. This warning may be provided a predetermined amount of time before the target vehicle is estimated to reach the curve. Upon detecting that the speed of the vehicle has not been reduced at another predetermined amount of time before the target vehicle is estimated to reach the curve, the processor device 302 may activate an advanced driver assistance system (ADAS) of the target vehicle (the vehicle function component 310), which may take over braking and/or throttle functions of the target vehicle. In another example, the processor device 302 may increase brake sensitivity and/or decrease throttle sensitivity of the target vehicle upon the service provider determining that the target vehicle will need to be slowed prior to reaching the curve.

Figure 4:
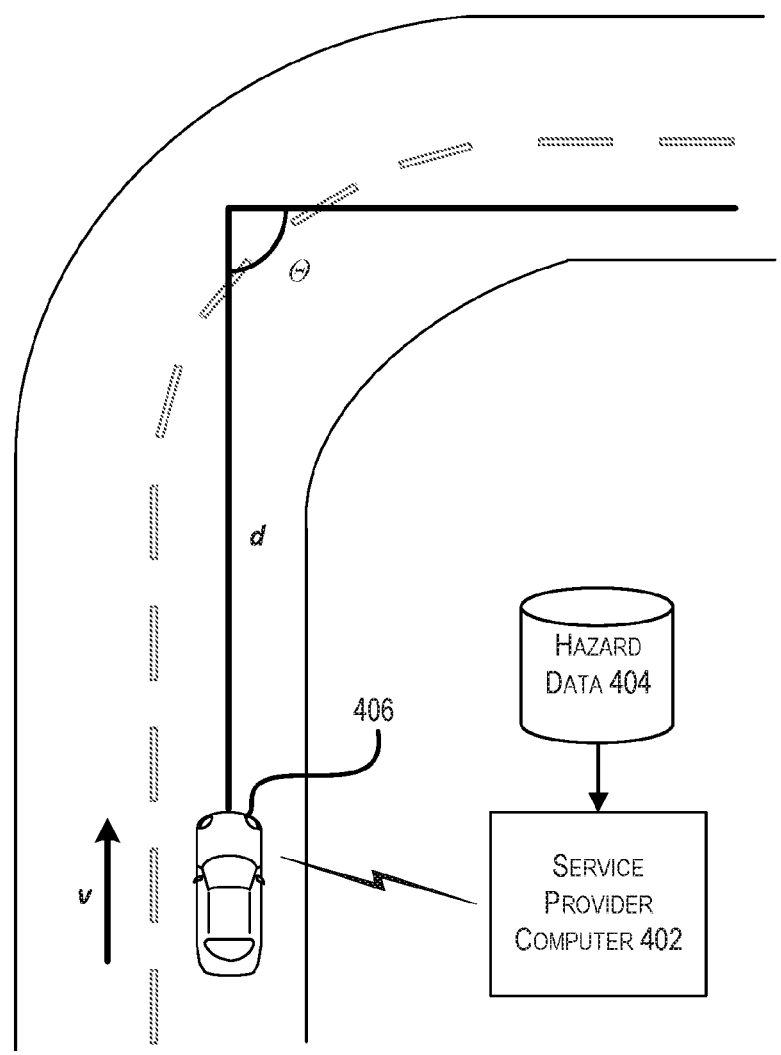
FIG. 4 depicts an illustrative example of a vehicle system operating to identify an upcoming hazard and mitigate a risk associated with the upcoming hazard in accordance with at least some embodiments.

FIG. 4 depicts an illustrative example of a vehicle system operating to identify an upcoming hazard and mitigate a risk associated with the upcoming hazard in accordance with at least some embodiments. In FIG. 4, a service provider computer 402 may maintain a hazard database 404 that includes information related to one or more hazards, as well as locations associated with the one or more hazards. The service provider computer 402 may be in communication with a vehicle 406. For example, the service provider computer 402 may be monitoring location information for the vehicle 406. In some embodiments, the service provider computer 402 may periodically query the hazard database 404 to identify hazards that are potentially relevant to the vehicle 406.

Upon identifying that a vehicle is approaching a hazard, the service provider computer may generate an appropriate mitigation strategy. In some embodiments, the service provider may determine a maximum or minimum safe speed at which a hazard should be traversed. In some embodiments, the service provider may identify one or more variables associated with the hazard itself and one or more variables associated with the vehicle that should be used in determining how the hazard should be traversed. In some embodiments, one or more of the variables may be stored with respect to the hazard in the hazard data 404. In some embodiments, one or more of the By way of illustrative example, consider a scenario in which the hazard is a curve in the road being approached by a vehicle 406, the service provider may identify an angle Θ of the curve, a distance over which the angle Θ is traversed, a distance d of the vehicle 406 from the curve, a velocity v of the vehicle 406, and a tire tread depth of the vehicle 406. At least some values for these variables may be maintained by the service provider with respect to the hazard. Some of these variables may be provided to the service provider computer 402 by a processor device of the vehicle 406. For example, the vehicle 406 may provide the vehicle's velocity v to the service provider computer 402. In some embodiments, the service provider computer 402 may obtain tire tread depth information from the processor device of the vehicle 406. In some embodiments, the service provider computer 402 may calculate the tire tread depth of the vehicle 406 based on the age of the tires and the amount of miles driven since the tires' replacement. Upon obtaining each of these variables, the service provider may calculate a maximum safe speed at which the vehicle 406 should traverse the curve. The service provider computer 402 may then determine whether the current velocity v of the vehicle 406 is above or below that maximum safe speed. If the velocity v is above the maximum safe speed, the service provider computer 402 may generate an instruction to the processor device to provide a warning to the vehicle's operator to reduce the speed of the vehicle. Additionally, the service provider computer 402 may provide an instruction to the processor device to cause an automatic braking system within the vehicle 406 to activate.

It should be noted that some or all of the variables used by the service provider computer 402 may be vehicle specific. Accordingly, it should be noted that a mitigation strategy determined for one vehicle may be different than a mitigation strategy determined for another vehicle. For example, a maximum safe speed for traversing a curve that is calculated for one vehicle may be different than a maximum safe speed calculated for another vehicle, even for the same curve. In some embodiments, the service provider computer 402 may also consider driver specific factors. For example, if a driver has a tendency to overcompensate when turning a vehicle, the service provider computer may recommend further reducing the speed of the vehicle.

Figure 5:
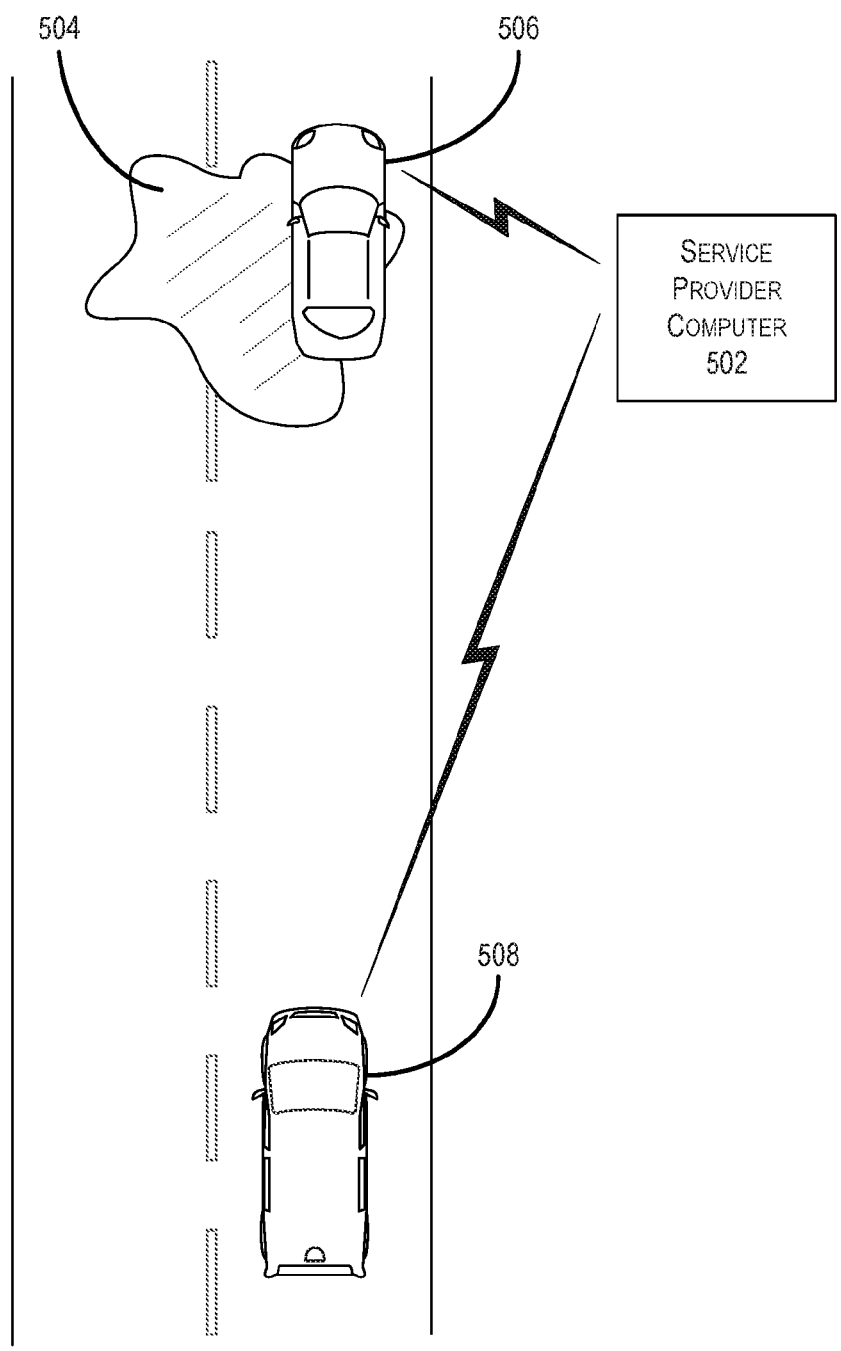
FIG. 5 depicts an illustrative example of the vehicle system operating with multiple vehicles in accordance with at least some embodiments.

FIG. 5 depicts an illustrative example of the vehicle system operating with multiple vehicles in accordance with at least some embodiments. In FIG. 5, a service provider computer 502 may be in communication with multiple vehicles. In some embodiments, each of the multiple vehicles may provide the service provider computer 502 with location data for that vehicle. For example, an onboard system installed in each vehicle may include a global positioning system device configured to acquire location coordinates. The onboard system in each of the multiple vehicles may transmit these location coordinates to the service provider computer at regular intervals.

In some embodiments, information related to a hazard 504 may be captured by a first vehicle 506 traveling through the hazard using one or more input sensors. For example, the first vehicle 506 may detect a "bump" that indicates that the tires of the first vehicle 506 have run over an object in the road. A processor device may capture the information related to the object in the road and send that information to a service provider computer 502. Upon receiving information related to the hazard 504 information from the first vehicle 506, the service provider may determine a location of the hazard 504 from the location coordinates of the first vehicle 506. The service provider may then identify, from location coordinate information, one or more second vehicle 508 that may be impacted by the hazard 504.

In some embodiments, the service provider computer 502 may receive coordinate information for a second vehicle 508. Upon receiving this information, the service provider computer 502 may determine if there are any hazards within the vicinity of the second vehicle 508. In some embodiments, a vicinity may be indicated by a predetermined distance from the second vehicle 508. For example, upon a first vehicle 506 detecting a hazard 504, the service provider 502 may identify a second vehicle 508 traveling toward the hazard. In this example, the service provider may provide a notification to a processor device installed in the second vehicle 508 related to the hazard. By way of further example, the processor device of the second vehicle 508 may notify the driver of the second vehicle 508 that he or she is approaching the hazard. In some embodiments, the notification may also include a location of the hazard 504 and/or an estimated time until the second vehicle reaches the hazard 504.

By way of illustrative example, consider the scenario in which a first vehicle 506 detects a loss of traction in a particular location. A processor device in the first vehicle 506 may determine that the loss of traction is likely due to a patch of ice or a sheet of water covering the road at that location. In some embodiments, the processor device may determine an outside temperature (via a thermometer in communication with the processor device) in order to determine whether the hazard is caused by ice on the road or whether the vehicle hydroplaned on water. The processor device of the first vehicle may then transmit the location at which the vehicle lost traction and any determined potential causes to the service provider computer 502. In this scenario, the service provider may store information related to the hazard 504 (ice and/or water over the roadway), along with a time that the hazard 504 was reported by the first vehicle 506, and a location of the hazard. Upon determining that a second vehicle 508 is approaching the hazard 504, the service provider may provide a mitigation strategy to the second vehicle 508 that includes a warning regarding the upcoming ice and/or an action to be taken to mitigate potential traction loss (e.g., activate an electronic stability control (ESC) system in the second vehicle 508).

By way of a second illustrative example, consider the scenario in which a first vehicle 506 suddenly slows down. The processor device of the first vehicle may determine from this sudden slowing that the first vehicle 506 has entered a traffic jam (a hazard 504). Information related to the traffic jam may be provided to the service provider computer 502. Upon receiving this information, the service provider computer may determine the location of the traffic jam from the location of the first vehicle 506 and store information related to the traffic jam in a database. Upon determining that a second vehicle 508 is approaching the coordinates of the traffic jam, the service provider may provide a mitigation strategy to the second vehicle 508 that includes a warning regarding the upcoming traffic and/or an action to be taken to mitigate a risk associated with a sudden slow down (e.g., increasing the vehicle's brake sensitivity).

Figure 6:
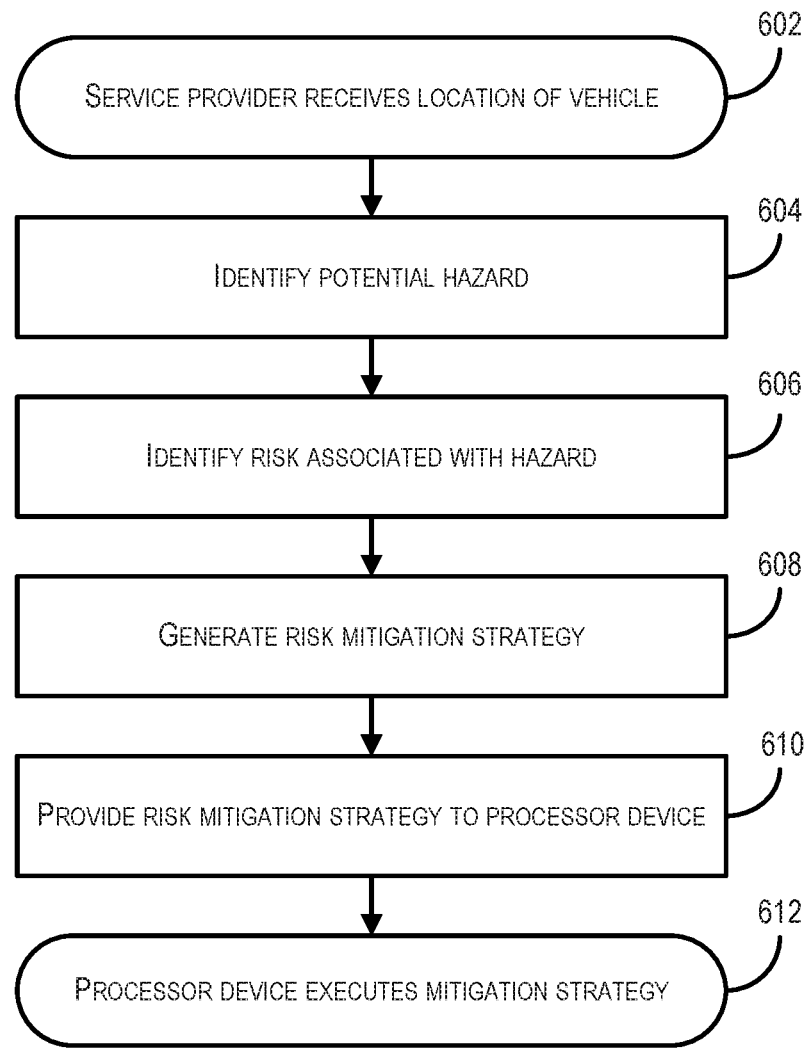
FIG. 6 depicts an illustrative flow diagram demonstrating an example vehicle system configured detect a hazard and warn an operator of in accordance with at least some embodiments.

FIG. 6 depicts an illustrative flow diagram demonstrating an example vehicle system configured detect a hazard and warn an operator of in accordance with at least some embodiments. The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 600 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by at least the one or more service provider computer 206 shown in FIG. 2. The code may be stored on a computer-readable storage medium, for example, in the form of a computer program including a plurality of instructions executable by one or more processors. The computer-readable storage medium may be non-transitory.

Process 600 may begin at 602, when a service provider receives a location of a target vehicle to be monitored. Upon receiving the location, the service provider computer may query a hazard database to identify one or more potential hazards within a vicinity of the target vehicle at 604. In some embodiments, the service provider may calculate a distance between the target vehicle's location and the hazard's location to determine whether it is within a predetermined distance. For example, given that a vehicle is located at coordinates $(X_V, Y_V)$ and a hazard is located at coordinates $(X_H, Y_H)$, the service provider may calculate the distance between the hazard and the target vehicle as the square root of $(X_V-X_H)^2+(Y_V-Y_H)^2$. Upon calculating this distance, the service provider may determine whether the calculated distance is less than a predetermined threshold distance. If so, then the service provider may determine that the hazard is in the vicinity of the vehicle. In some embodiments, the service provider may determine that a hazard is in the path of the target vehicle (the target vehicle is heading in the direction of the hazard on the same road that the hazard is located on).

Once the service provider has identified one or more hazards potentially relevant to a target vehicle, the service provider may identify a risk associated with the hazard at 606. In some embodiments, the service provider may determine which vehicle systems may be effected by the hazard. For example, if the hazard is a patch of ice, then the risk to the vehicle may be a loss of tire traction. In another example, if the hazard is a curve in the road, then the risk to the vehicle may be a loss of control due to an unsafe vehicle speed. In some embodiments, each risk identified by the service provider may be associated with a set of mitigation actions.

The service provider may be configured to generate a mitigation strategy to mitigate one or more of the identified risks at 608. In some embodiments, the service provider may identify each risk associated with the hazard and query a database to identify one or more actions associated with each identified risk. The service provider may determine at least one action to be included in a mitigation strategy for each risk identified. In some embodiments, the service provider may determine a best action as one that mitigates the largest number of the identified risks.

Once the service provider has generated a risk mitigation strategy, it may provide that risk mitigation strategy to the processor device of the target vehicle at 610. In some embodiments, the actions included in the risk mitigation strategy may take the form of computer executable code that may be executed by the processor device. In some embodiments, the mitigation strategy may be a workflow, or other series of steps, that includes each of the identified actions and a timeline for executing them.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A vehicle apparatus, comprising:
   one or more input sensors;
   an antenna device; and
   a processor device configured to:
   receive input from the one or more input sensors, the input including a location of a vehicle;
   provide the received input to a service provider computer via the antenna device;
   receive, from the service provider computer and in response to providing the received input, a mitigation strategy generated based on an identification of at least one hazard in the vicinity of the vehicle apparatus and based on one or more driver specific factors including a driver's tendency to overcompensate when turning, the mitigation strategy including instructions to perform at least a first action and a second action, each of which is calculated to reduce a risk associated with the at least one hazard, wherein the first action comprises an action to provide a notification to a driver and the second action comprises an action to increase a brake sensitivity of the vehicle,
   wherein the instructions to perform the second action are configured to be executed upon determining that the first action was ineffective;
   and
   execute the at least one action.

2. The vehicle apparatus of claim 1, further comprising an output device, wherein the processor device is further configured to provide a notification to an operator of the vehicle apparatus via the output device.

3. The vehicle apparatus of claim 1, wherein the antenna device is configured to enable communication via a cellular network.

4. The vehicle apparatus of claim 1, wherein the one or more input sensors includes a global positioning system device.

5. The vehicle apparatus of claim 4, wherein the input related to the location of the vehicle is a set of geographic coordinates.

6. A method comprising:
   receiving, from one or more input sensors, input information related to a vehicle, the input information including at least a location information;
   determining, based at least in part on the received input information, a hazard that the vehicle is projected to encounter;
   determining, based at least in part on a type associated with the hazard, a plurality of actions to be taken by the vehicle to mitigate a risk associated with the hazard, the plurality of actions including:
   a first action to provide a notification to a driver of the vehicle; and
   a second action to mitigate the risk associated with the hazard that comprises causing a vehicle component to activate, the second action being determined based on a type of the hazard and one or more driver specific factors including a driver's tendency to overcompensate when turning; and
   provide, instructions to execute the plurality of actions to the vehicle, such that the instructions cause the vehicle to execute the second action upon determining that the first action was ineffective.

7. The method of claim 6, wherein the indication of the a plurality of actions includes a set of computer executable instructions.

8. The method of claim 6, wherein the a plurality of actions to be taken by the vehicle includes activating a braking system on the vehicle.

9. The method of claim 6, wherein the a plurality of actions includes multiple timed actions, each of the multiple timed actions being executed at determined times.

10. The method of claim 6, wherein the risk associated with the hazard is a risk that a vehicle function will be affected by the hazard.

11. The method of claim 6, wherein the a plurality of actions is determined based at least in part on an attribute of a driver of the vehicle.

12. A vehicle system, comprising:
a processor device; and
a memory including instructions that, when executed with the processor device, cause the system to, at least:
receive an indication of a location associated with a vehicle;
identify, based at least in part on the received indication, at least one hazard within a vicinity of the vehicle;
determine a set of safety protocols calculated to mitigate the hazard, the set of safety protocols including:
a first protocol that includes instructions to provide a notification to a driver of the vehicle; and
a second protocol that includes instructions to cause a vehicle component to activate, the second protocol being determined based on a type of the hazard and one or more driver specific factors including a driver's tendency to overcompensate when turning; and
provide the set of safety protocols to the vehicle, wherein the vehicle is configured to take at least one action based on the set of safety protocols, the second protocol being executed upon detecting that the first protocol is ineffective.

13. The vehicle system of claim 12, wherein the instructions further cause the system to at least:
receive a second location associated with a second vehicle;
determine, based at least in part on input received from the second vehicle, that a second hazard has been encountered by the second vehicle; and
store information related to the second hazard in a memory with respect to the second location.

14. The vehicle system of claim 13, wherein the instructions further cause the system to at least:
determine that the second hazard is within the vicinity of the vehicle;
determine a second set of safety protocols calculated to mitigate the second hazard; and
provide the second set of safety protocols to the vehicle.

15. The vehicle system of claim 12, wherein the vicinity of the vehicle is a predetermined distance from the vehicle.

16. The vehicle system of claim 15, wherein the vicinity of the vehicle is a distance calculated based on the speed of the vehicle.

17. The vehicle system of claim 12, wherein the set of safety protocols includes an instruction to activate a function of the vehicle.

18. The vehicle apparatus of claim 1, wherein the input also includes condition information for the vehicle, and the mitigation strategy is generated by the service provider using the provided condition information.

19. The vehicle apparatus of claim 1, wherein the mitigation strategy also includes a condition upon which the at least one action is to be executed, and the processor device is further configured to execute the at least one action upon detecting that the condition has been met.

* * * * *